(12) United States Patent
Giuffré

(10) Patent No.: US 8,002,496 B2
(45) Date of Patent: Aug. 23, 2011

(54) IRRIGATION PIPE

(75) Inventor: Carmelo Giuffré, Capo D'Orlando (IT)

(73) Assignee: SIPLAST S.p.A., Capo D'Orlando (IT)

( * ) Notice: Subject to any disclaimer, the term of this patent is extended or adjusted under 35 U.S.C. 154(b) by 399 days.

(21) Appl. No.: 12/094,796

(22) PCT Filed: Oct. 23, 2006

(86) PCT No.: PCT/EP2006/067672
§ 371 (c)(1),
(2), (4) Date: Jul. 28, 2008

(87) PCT Pub. No.: WO2007/068523
PCT Pub. Date: Jun. 21, 2007

(65) Prior Publication Data
US 2009/0314377 A1     Dec. 24, 2009

(30) Foreign Application Priority Data
Dec. 15, 2005  (IT) ............................. SV2005A0042

(51) Int. Cl.
*E02B 11/00*     (2006.01)
(52) U.S. Cl. ............................. 405/43; 405/45; 239/542

(58) Field of Classification Search ................ 405/39, 405/43, 45, 47; 239/542; 138/42, 116
See application file for complete search history.

(56) References Cited

U.S. PATENT DOCUMENTS

| | | | |
|---|---|---|---|
| 4,430,020 A * | 2/1984 | Robbins | 405/43 |
| 4,763,842 A * | 8/1988 | Dunn | |
| 5,732,887 A * | 3/1998 | Roberts | |
| 6,543,509 B1 * | 4/2003 | Harrold | |
| 2005/0258278 A1 * | 11/2005 | Cohen | |

FOREIGN PATENT DOCUMENTS
WO    0001219    *   1/2000

* cited by examiner

*Primary Examiner* — John Kreck
*Assistant Examiner* — Sean Andrish
(74) *Attorney, Agent, or Firm* — Themis Law

(57) ABSTRACT

Irrigation pipe including a pipe having at least a longitudinal row of delivery holes arranged at predetermined distances and communicating with a dripping unit provided inside the pipe, and further having an inlet communicating with the inside of the pipe and an outlet communicating with at least one delivery hole. The inlets or outlets of some or all of the dripping units communicate with the inner space of the pipe or with some or all of the delivery holes through an inlet collecting channel or an outlet collecting channel or segments thereof.

32 Claims, 12 Drawing Sheets

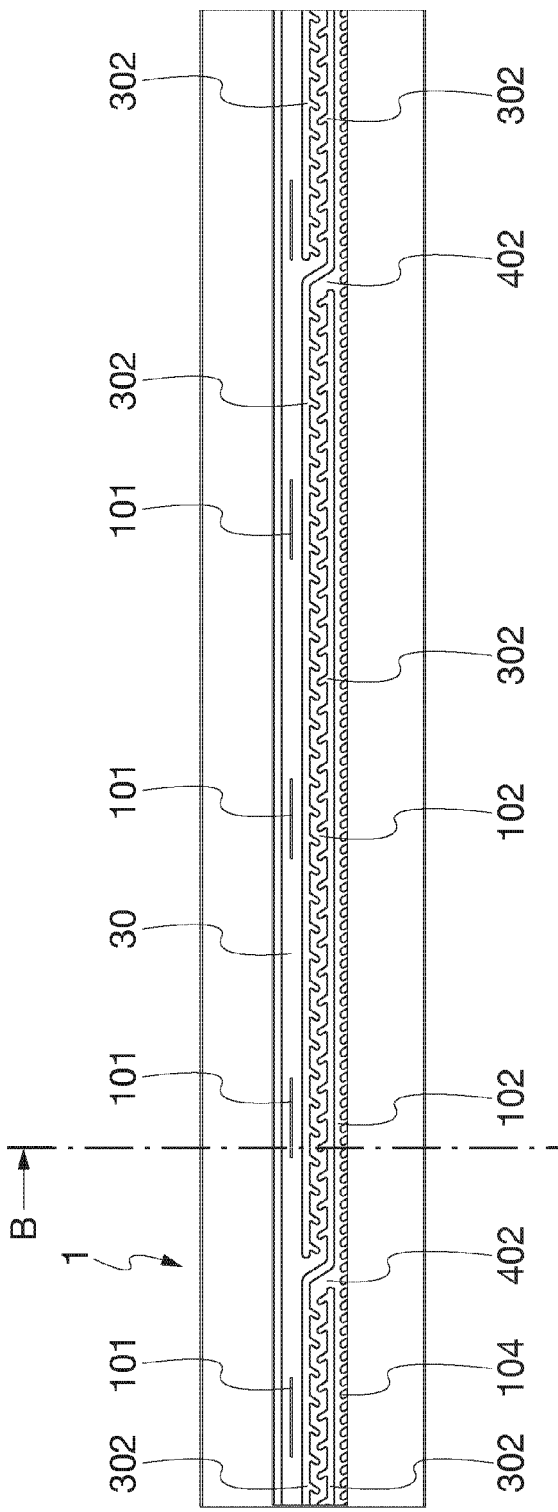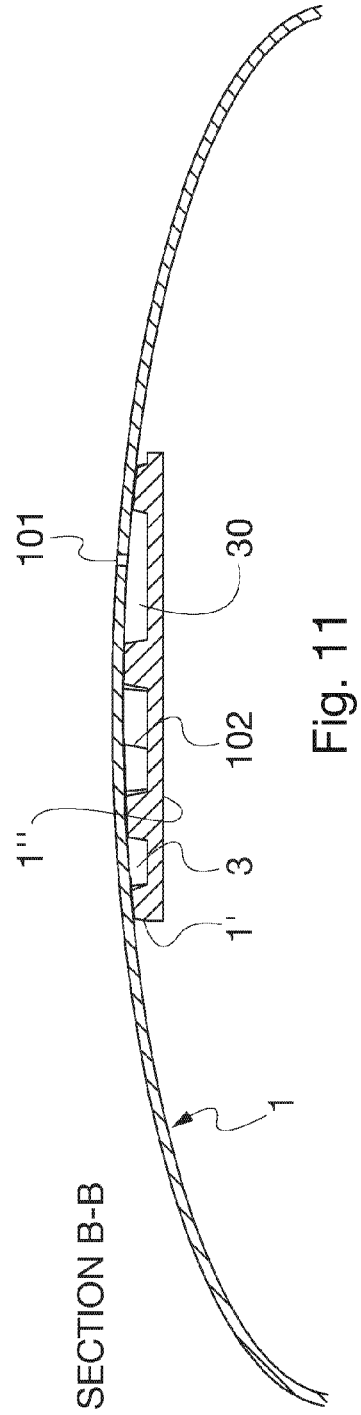

IRRIGATION PIPE

FIELD OF THE INVENTION

The present invention relates to an irrigation pipe comprising an elongated pipe element having at least a longitudinal row of delivery holes arranged at predetermined distances, each of which holes communicates with a dripping unit provided inside the pipe, and further having at least an inlet communicating with the inside of the pipe and at least an outlet communicating with at least a delivery hole.

More particularly, the present invention relates to a pipe having dripping units formed on a continuous tape intended to adhere against a coinciding longitudinal band of the pipe inner wall, along which band the row of delivery holes extends, which tape provides the wall of said dripping units faced towards the inside of the pipe. At the side adhering to the inner wall of the pipe, the tape has longitudinal ribs outwardly projecting from said side of the tape and acting like bridges spacing the tape from the corresponding inner side of the pipe, and shaped according to such a pattern that when the ends or free sides of these ribs adhere against the inner side of the pipe, they provide, between said inner side and the tape, passages and/or chambers of elements of a repetitive sequence of identical dripping units, which are spaced apart such that each dripping unit has an outlet collecting element disposed coincidentally with at least a delivery hole of the pipe.

BACKGROUND OF THE INVENTION

Irrigation pipes are generally known and are described for example in documents: EP865541, EP278049, U.S. Pat. No. 5,688,072, U.S. Pat. No. 6,543,509.

The prior art documents show at least two types of pipes. In one case, the pipe is manufactured by folding a longitudinal tape and by securing the longitudinal edges. The latter are overlapped by a certain extent and dripping units are made, providing ribs according to a predetermined pattern and in one of the marginal, longitudinal bands of the tape. When the marginal bands are overlapped for creating the pipe wall, ribs make passages and/or chambers composing individual dripping units by being interposed between said marginal bands and by keeping them spaced apart.

In this case, the pipe is not closed, and moreover the tape forming one of the two walls of dripping units is not present.

Other prior art documents mentioned above, on the contrary provide for the dripping units differently. In these pipes, a tape intended to form the sequence of dripping units together with the inner side of the pipe is inserted and chemically-physically adhered to the inner wall of the pipe, whereas the pipe is made by a tubular wall that is already closed in its section. The invention relates particularly to this type of pipes with a previously closed or continuous cross section, wherein the sequence of dripping units is not provided along the band that by overlapping and/or a chemical/physical adhesion mutually connects the two marginal, longitudinal bands of a tape folded about an axis parallel to the longitudinal axis of the material tape and/or the finished pipe.

Concerning the operation of these pipes, there are contrasting needs and conditions. On the one hand, the distribution of the delivered fluid throughout the length of the pipe under different conditions of pressure of the fluid is desired. On the other hand, there are also needs for avoiding too small passages and chambers, which can be easily clogged due to minute impurity particles present in the fluid.

To this aim, the inlet element of dripping units includes a filter. However, such filter has to be selective enough to prevent relatively small impurity particles from entering. That causes the flow rate of each dripping unit to considerably decrease and so a control of the fluid pressure should be required, in order to increase it to predetermined higher values.

Moreover in known pipes it has been highlighted above all with low fluid pressures and particularly for long lengths of the irrigation pipe, that there is a lack in evenness of the delivery flow rate of the fluid from delivery holes arranged throughout the pipe length, particularly the condition according to which a greater fluid amount is delivered from some delivery holes than other ones.

More generally, the invention aims at providing a pipe of the type described hereinbefore, wherein the sequence of dripping units is made such that a better evenness of the fluid flow delivered from holes of the sequence of delivery holes is guaranteed and also for great lengths of the irrigation pipe and/or for low delivery pressures.

In addition, the present invention is directed to guaranteeing that even if an inlet filter and/or passages of fluid inside the structure of some dripping units are clogged, the fluid delivery is not completely stopped from delivery hole or holes served by dripping units subjected to said malfunctioning conditions.

Therefore, the invention aims at obtaining a greater delivery evenness and a greater certainty about the operating life and safety of the delivery pipe.

All that without greater manufacturing and maintenance costs.

The present invention aims also at improving a pipe of the described type, such that by means of simple and cheap expedients, it is possible to effectively filter the fluid before it enters in dripping units, without restricting the flow rate of the entering fluid, but potentially increasing it with respect to known dripping units of this kind of pipe.

Particularly as regards this specific aspect, the invention aims at improving an irrigation pipe of the type described hereinbefore by providing a new pattern of projections or ribs projecting from the tape forming one of the constructive parts of the sequence of dripping units, by which a new type of element filtering the fluid is obtained at the inlet side of the dripping units.

A further aim of the invention is to provide an effective filtering action and at the same time a satisfying supply of the flow rate of the fluid to be delivered to dripping units even when the filtering element is partially clogged.

SUMMARY OF THE INVENTION

The invention achieves the above aims by providing a pipe of the type described hereinbefore, wherein inlets of all or a certain amount of dripping units, or outlets of all or a certain amount of dripping units communicate with the inner space of the pipe or with all or a certain amount of delivery holes respectively by means of an inlet or outlet collecting channel or of a segment of said inlet or outlet collecting channel.

In one embodiment, the irrigation pipe according to the present invention has only one inlet collecting channel extending throughout the longitudinal extension of the pipe or throughout the extension of the longitudinal row of dripping units.

In this case, the inlet collecting channel extends laterally to the longitudinal row of dripping units and is delimited by a side longitudinal wall at the side faced towards the inside of the pipe and by side walls of dripping units of said longitudinal row of dripping units at the side faced towards said dripping units. Advantageously, the wall delimiting the inlet collecting channel at the side faced towards the inner space of the pipe is provided with a plurality of inlets arranged throughout the length of said inlet collecting channel, by which this channel communicates with the inner space of the pipe, each inlet being provided with an inlet filter.

An alternative and particularly advantageous embodiment has the wall delimiting the inlet collecting channel at the side faced towards the inner space of the pipe as made permeable to the fluid throughout its longitudinal extension or throughout the greatest portion of said longitudinal extension, said wall or the greatest portion of said wall being composed of a filtering element for the entering fluid. Therefore, in this embodiment, the filtering element is independent and separated from individual dripping units, there being provided at least an inlet collecting channel between the inlet of said dripping units and the filtering element. This inlet collecting channel may be continuous or, according to a variant embodiment, may be composed of a sequence of inlet collecting channel segments that do not directly communicate one with the other and are arranged in a longitudinal row. When dripping units are conventionally made, that is, each one is composed of a pressure reduction element and of a following collecting element communicating with at least a delivery hole of the pipe, said dripping units communicate with said fluid inlet collecting channel directly by means of corresponding pressure reduction elements or indirectly by means of secondary filtering elements provided at the inlet of each pressure reduction element of each dripping unit.

When said supplying channel is in common to all dripping units of the longitudinal sequence of dripping units extending for the length of the pipe, or for a certain predetermined length less than the entire length of the pipe, the supplying channel extends continuously at one side of said longitudinal sequence of dripping units. In this case, the supplying channel serves all dripping units provided in the irrigation pipe.

On the contrary, when said supplying channel is common only to a part of the dripping units of the longitudinal sequence of dripping units, then there are provided dripping channel sections, whose extension is such that it reaches dripping units supplied by it.

In this case, it is advantageous to provide a longitudinal sequence of said supplying channel sections extending laterally to the sequence of dripping units.

A preferred embodiment has the supplying channel at one side of the sequence of dripping units made of a longitudinal wall parallel to the extension of the sequence of dripping units and provided at a certain distance from side walls of the pressure reduction element and of the outlet collecting element of dripping units delimiting the common channel at the side opposite to said longitudinal wall. In this case, filtering elements are provided at said longitudinal wall.

According to a first embodiment, along the extension of said side longitudinal wall, spaced apart inlets are arranged, at which filtering elements are provided. The latter may be made in a conventional way i.e. may be composed of one or more rows of little spaced apart prisms, prisms of neighboring rows being quincuncially arranged. In this case, said row or rows of prisms have a finite length and are arranged at missing or open portions of said side wall delimiting the supplying channel, which portions have a length corresponding to the length of said rows of prisms and provide the fluid inlets in the supplying channel. A variant includes the entire side outer wall delimiting the supplying channel as permeable to the fluid and composed of a filtering element.

Even in this case it is possible to use a filtering element having a known structure, i.e. composed of one or more parallel rows of prisms quincuncially arranged. In this variant embodiment, the side wall delimiting the supplying channel is composed substantially completely and without interruption of one or at least two rows of spaced apart prisms, prisms of the at least two rows being quincuncially arranged.

In this case the advantage is clear, since the filtering surface has the same length of the supplying channel and it is possible to provide a highly selective filter, without limiting the flow rate of the fluid to such an extent to make it insufficient for the irrigation action the pipe is intended for.

Again according to an advantageous embodiment, it is possible to provide a fluid supplying channel of the type described above at both longitudinal sides of the longitudinal sequence of dripping elements.

In this case, dripping units (all or even for only a part thereof) can communicate with both supplying channels. In the case of two supplying channels, each one provided at one side of the sequence of dripping units, it is possible to provide any constructional combination of individual supplying channels among the ones described above, and said construction may be the same or different for each one of the two channels. So, for example, a supplying channel may be continuous and the other one may be discontinuous, i.e. divided in sections. One of the channels may have a continuous filter and the other one may have a discontinuous filter or both channels may be identical.

According to an advantageous embodiment, the invention includes a longitudinal, continuous supplying channel, in common to at least a part of the dripping units or to all dripping units of the longitudinal sequence of dripping units, extending at both longitudinal sides of the sequence of dripping units, whereas individual fluid pressure reduction elements of individual dripping units communicate with both said supplying channels. Advantages of the present invention are clear from what has been mentioned above and are the separation of the filtering elements from further elements composing the dripping unit, and the provision of a supplying collecting element in common to at least a part of the dripping units or to all dripping units, as well a collecting element with various inlets arranged throughout its length. The filtering elements prevent the water flowing towards a dripping unit from being stopped if a filter is clogged. The common supplying channel, that is, said collecting element can be always accessed by each dripping units and can be always accessed by the fluid through various fluid inlets with a filtering element. Therefore, when a filtering element become clogged and so the fluid flow is prevented, the fluid can be supplied all the same to the collecting element, that is, to the supplying channel through other inlets and corresponding filtering elements.

The further improvement includes the wall delimiting the supplying channel or channels as composing a collecting element and as an entire filtering element and so completely permeable to fluid, providing a considerable fluid flow rate to the dripping units and more selective filters, i.e. with smaller passage inlets without reducing too much the flow rate. Moreover, making two supplying channels as supplying collecting elements of the dripping units provides for a supply of the fluid to the dripping units with a collecting element having a surface in contact with the fluid that is substantially twice the length of the pipe and that substantially has an amount of fluid inlets that is twice with respect to the usual condition.

The filtering action retaining smaller particles is obviously a great advantage, considering the fact that pressure reduction elements provided in the dripping units are composed of so called labyrinths having very small passageways and, therefore, subjected to clogging due to suspended particles in the fluid that accumulate. In known labyrinths, therefore, it is necessary to keep structures and passage sections satisfying the function of fluid pressure reduction but at the same time not contributing to the storage of suspended particles. These conditions are contrasting and a more effective filtering action eliminating smaller particles reduces the probabilities of clogging of actual labyrinths and/or enables the adoption of size and geometrical configurations of said labyrinths that are more effective for the function of reducing the pressure without increasing clogging probabilities. Moreover, a greater effectiveness of labyrinths allows to limit their size and so to increase the number of dripping units by length unit. Substantially, from the practical point of view, a hose with a reduced dripping step and a hose with a wider dripping step made according to the present invention have the same filtering value this is due only to the hose length. In usual and known hoses this is not possible, since the filter being part of dripping units and the latter being composed of the filtering element followed by the pressure reduction element and followed by the outlet collecting element all aligned one after the other and in the longitudinal direction of the pipe (with reference to the direction for the fluid passage in the dripping unit), the reduction of the length of dripping units being such as to have a smaller step of dripping slits and requiring a reduction in the length of the filter and so a change in the filtering capacity.

A further advantage is that by keeping current configurations of labyrinths of pressure reduction elements provided in the dripping units, it is possible to improve the performance of these elements without increasing overall length size of dripping units but at the same time increasing the length of the labyrinths. Therefore, for the same dripping step, i.e. the distance of the dripping slits of the pipe, as in pipes according to the prior art, the invention provides an improvement to the effect of the pressure reduction of fluid reaching the outlet collecting element of dripping units. In combination to or as an alternative to the above, the irrigation pipe according to the present invention can provide each dripping unit with a pressure reduction element feeding an outlet collecting element, which outlet collecting element communicates with at least a delivery hole in the pipe wall, the outlet collecting channel being composed of a channel connecting all or a certain amount of outlet collecting elements.

In a preferred embodiment, outlet collecting elements of dripping units or of a certain amount of said dripping units of the longitudinal sequence of dripping units are composed of the same outlet collecting channel or of a segment of said outlet collecting channel, delivery holes in the pipe wall being provided coincident with said outlet collecting channel or with said outlet collecting channel segment.

When each dripping unit is composed of a pressure reduction element, the outlet of pressure reduction elements of all or a certain number of dripping units of the longitudinal row of dripping units is connected one with the other by the outlet collecting channel or by an outlet collecting channel segment, by which the delivery holes are disposed.

Advantageously and like the inlet collecting channel previously described, the outlet collecting channel can extends laterally with respect to the longitudinal row of dripping units and is delimited by a longitudinal side wall at the side faced towards the inside of the pipe and by the side walls of the dripping units of said longitudinal row of dripping units at the side faced towards said dripping units, whereas at the side faced towards the dripping units there are provided outlets thereof communicating with said outlet collecting channel, delivery holes of the pipe being provided in the longitudinal wall band of the pipe coinciding with the inner space of said outlet collecting channel.

Even the outlet collecting channel may be a channel continuous throughout the longitudinal extension of the pipe or throughout the longitudinal extension of the row of dripping units, or may be composed of a row of outlet collecting channel segments, which do not directly communicate one with the other and with which a certain amount of dripping units or pressure reduction elements of said dripping units and a certain amount of delivery holes of the pipe communicate.

The irrigation pipe according to the present invention comprises a longitudinal row of dripping units inside it, and at least at one side thereof an adjacent inlet or outlet collecting channel is provided.

Therefore, the preferred embodiment of the invention provides for an irrigation pipe, inside which there is provided a longitudinal row of dripping units having two longitudinal sides each provided with an adjacent inlet and/or outlet collecting channel.

Particularly, the two collecting channels are an inlet collecting channel and an outlet collecting channel respectively.

When the central row of dripping units includes a row of filtering elements, the filtering elements are provided with an inlet and a longitudinal end, which inlet communicates with the inlet collecting channel or with a segment of said channel, and are further provided with an outlet at the opposite longitudinal end respectively, which outlet directly communicates with the outlet collecting channel or with a segment of said channel or with an outlet collecting element of the corresponding dripping unit, which is connected by means of an outlet collecting channel or a segment of said outlet collecting channel to other outlet collecting elements of other dripping units. A variant can also provides the two collecting channels to be two inlet collecting channels.

In this case, the central row of dripping units is composed of a row of filtering elements each feeding a dedicated outlet collecting element with, which one or more delivery holes communicate, each filtering element being provided with an inlet at a longitudinal end. Said inlet communicates with only one or both inlet collecting channels or with a segment of these channels, and the outlet of each provided filtering element feeds the longitudinal end opposite to the inlet in the dedicated outlet collecting element that is longitudinally aligned with said filtering element. Further improvements of the invention are the object of appended claims. In particular, a tape for making the irrigation pipe is described hereinafter, which tape has a series of ribs applied on it according to a predetermined pattern such that said ribs form elements spacing the tape from the inner wall of the pipe, and which includes elements sealingly fastening the tape to the inner wall of the pipe and at the same time generating collecting channels and dripping unit elements.

BRIEF DESCRIPTION OF THE DRAWINGS

Characteristics of the invention and advantages deriving therefrom will be more apparent from the following description of some non-limiting embodiments shown in annexed drawings, wherein:

FIGS. 8 to 10 are, similarly to FIGS. 3 to 5, a second variant exemplary pipe according to the present invention.

FIG. 11 is a cross-section of the irrigation pipe according to the pipe of FIGS. 8 to 10.

DETAILED DESCRIPTION OF EMBODIMENTS OF THE INVENTION

With reference to the description and claims, the term longitudinal row means a row of elements arranged one after the other along a straight line or a line oriented longitudinally in relation to the pipe, that is, preferably but not necessarily parallel to the axis of said pipe. Even if from the manufacturing point of view it is definitely faster and simpler to make the row of dripping units having an orientation according to an axis parallel to the axis of the pipe, it is not to be excluded for said row of dripping units to be extended also along an axis having a path along a not straight line for example a undulating line or an helicoidal line.

Figure 1:
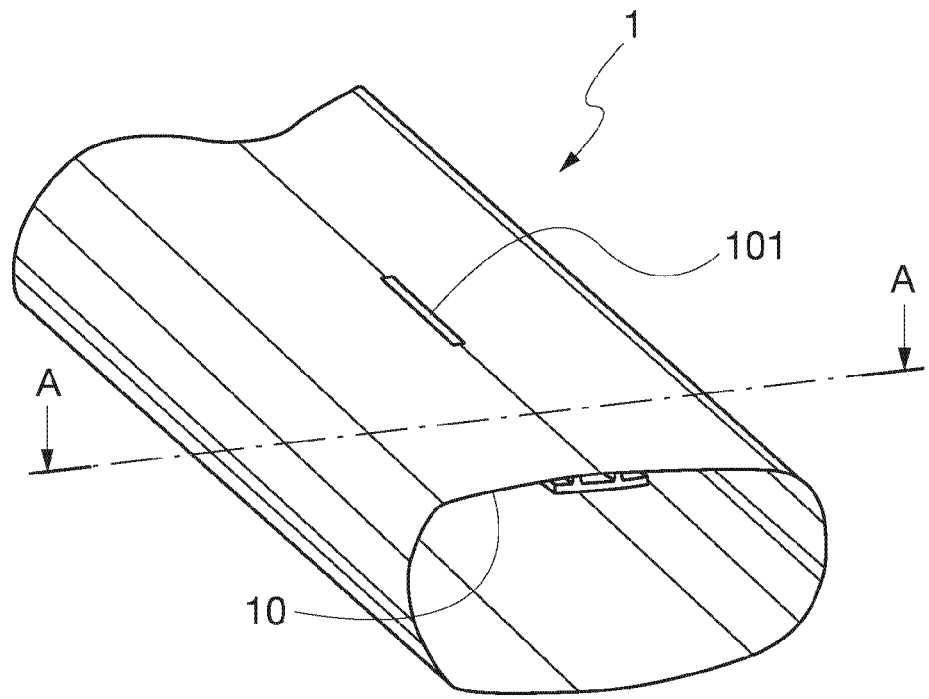
FIG. 1 is an exemplary irrigation pipe segment according to the present invention.
Figure 2:
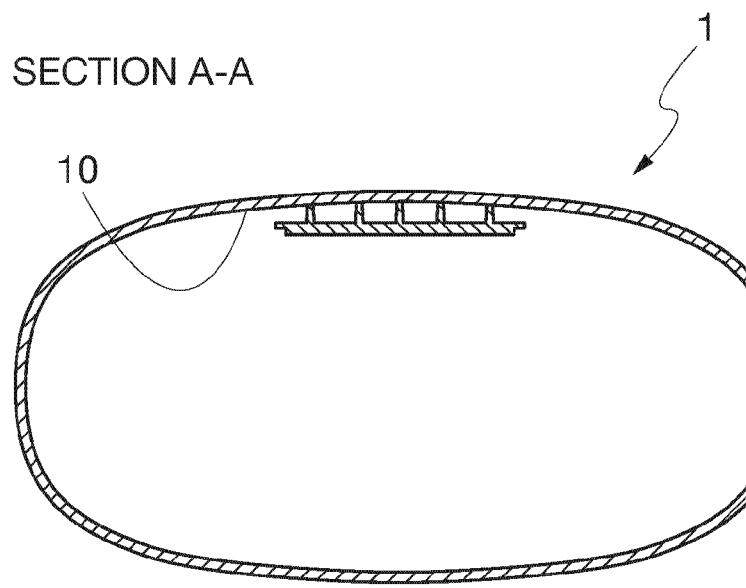
FIG. 2 is an enlarged cross-section of the pipe according to FIG. 1.
Figure 3:
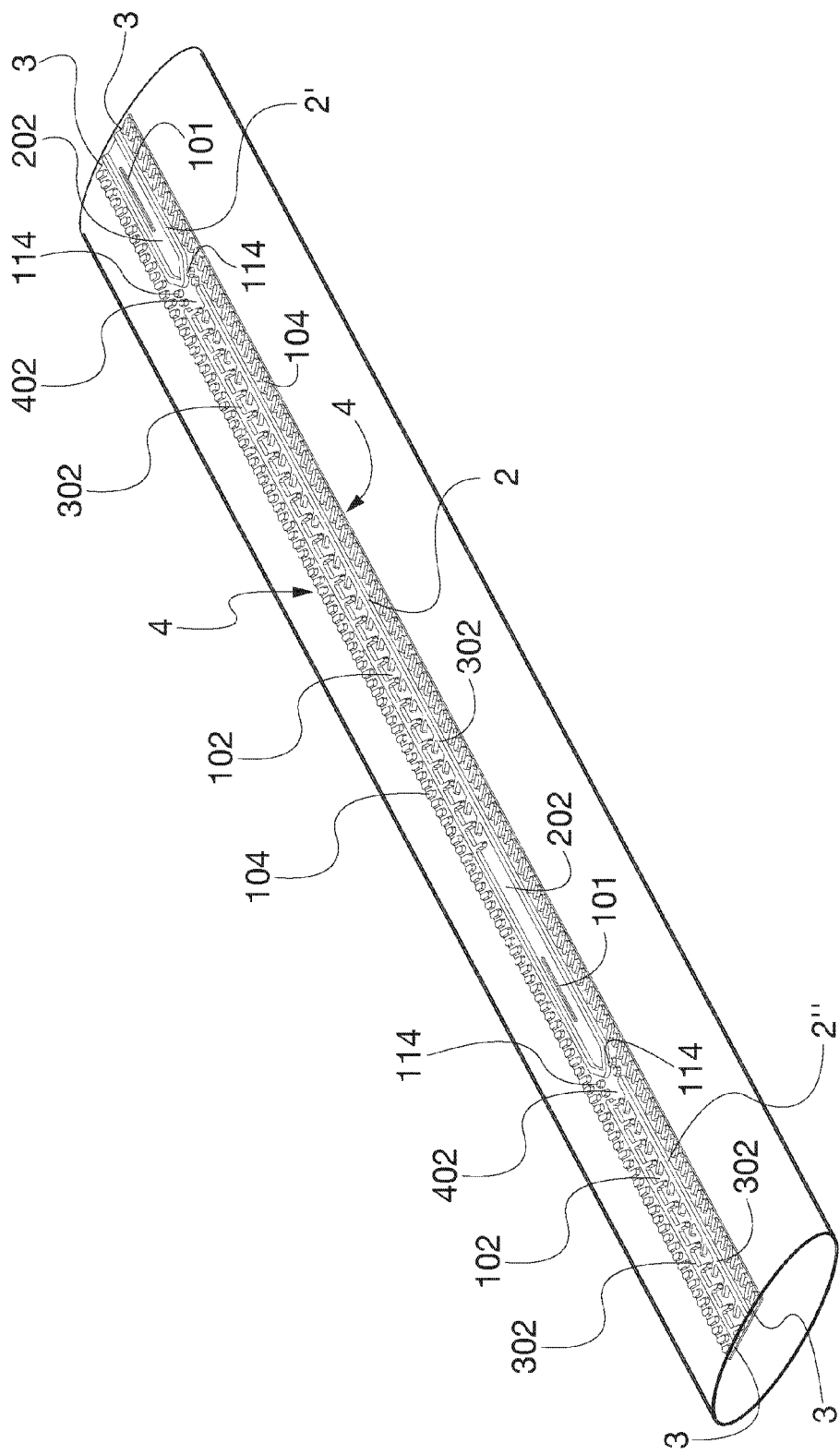
FIG. 3 is a first variant exemplary pipe according to the present invention, wherein the longitudinal row of dripping units is arranged between two inlet collecting channels extending throughout the length of said longitudinal row of dripping units at the two sides of the dripping units of said row, the entire side wall which delimits inlet collecting channels toward the inside of the pipe being permeable to fluid flow and being completely composed of a continuous filtering element, whose extension is equal to the extension of the corresponding supplying channel and possibly of the pipe.

With reference to FIGS. 1 to 5, there is shown an irrigation pipe of the so called drip type. A pipe 1 having a perimetral wall completely closed in itself without interruption has a sequence of dripping units 2 inside it and along a longitudinal band of said pipe wall. With particular reference to FIG. 3, dripping units 2, 2' and 2" are shown. More particularly, the dripping units are composed of a pressure reduction element 102 and an outlet collecting element 202. The outlet collecting element forms a chamber communicating and/or coinciding with a dripping slit 101, i.e. a delivery hole, provided in the wall of the pipe 1. The wall of the pipe 1 has a plurality of said dripping slits 101 aligned according to a longitudinal straight line coinciding with the longitudinal band of the pipe wall, along which the sequence of dripping units 2 is provided. Moreover, the distance of dripping slits 101 one with respect to the other, so called dripping step, in the axial direction of the pipe corresponds to the distance of outlet collecting elements 202 of dripping units that are arranged in a row to form a longitudinal sequence of said dripping units 2. Thanks to this arrangement, each dripping slit 101 of the pipe, that is, each delivery hole, coincides with or communicates with the outlet collecting element 202 of one of the dripping units 2 of the sequence of dripping units.

At the two sides of the row or sequence of dripping units 2 there is provided a channel 3 acting as a fluid inlet collecting channel respectively. Each one of said inlet collecting channels 3 is laterally delimited towards the inner space of the pipe by a side wall 103 and at the opposite side, i.e. the side adjacent to the sequence of dripping units, by side walls 302 delimiting elements 102 and 202 forming dripping units 2. Dripping units 2 communicate with delivery collecting channels 3 by an inlet 402 of the corresponding pressure reduction element 102.

The pressure reduction element 102 of dripping units 2 is made as known by a labyrinth element having pressure reducing protrusions 102', wherein fluid passages are such that the passage rate is modified and so a pressure reduction of fluid collected in the outlet collecting element 202 is obtained. The pressure is reduced to such an extent to allow a substantially even dripping for determinate extended lengths of the sequence of dripping units and so of the irrigation pipe when the pressure supplying the fluid in the pipe has typical average values provided in irrigation systems of this type.

However both the pressure reduction element 102 with the labyrinth, and the outlet collecting element 202 of dripping units 2 is manufactured according to the prior art and these elements are described in more details and in different configurations, for example in documents EP865541, EP278049, U.S. Pat. No. 5,688,072, U.S. Pat. No. 6,543,509, already mentioned above.

The fluid passes from the inner space of the pipe 1 in inlet collecting channels 3 by inlets 105 of the wall 103 externally laterally delimiting said channels, at which inlets a filtering element is provided.

Among the various possible embodiments for manufacturing the inlets and corresponding filtering elements, the embodiment of FIGS. 1 to 5 is particularly advantageous. As shown in FIGS. 1-5, the whole side of outer wall 103 delimiting inlet collecting channels 3 is made permeable to the fluid and advantageously is composed of a continuous filtering element 4 extending throughout the length of said side outer wall 103 delimiting inlet collecting channels 3.

Figure 4:
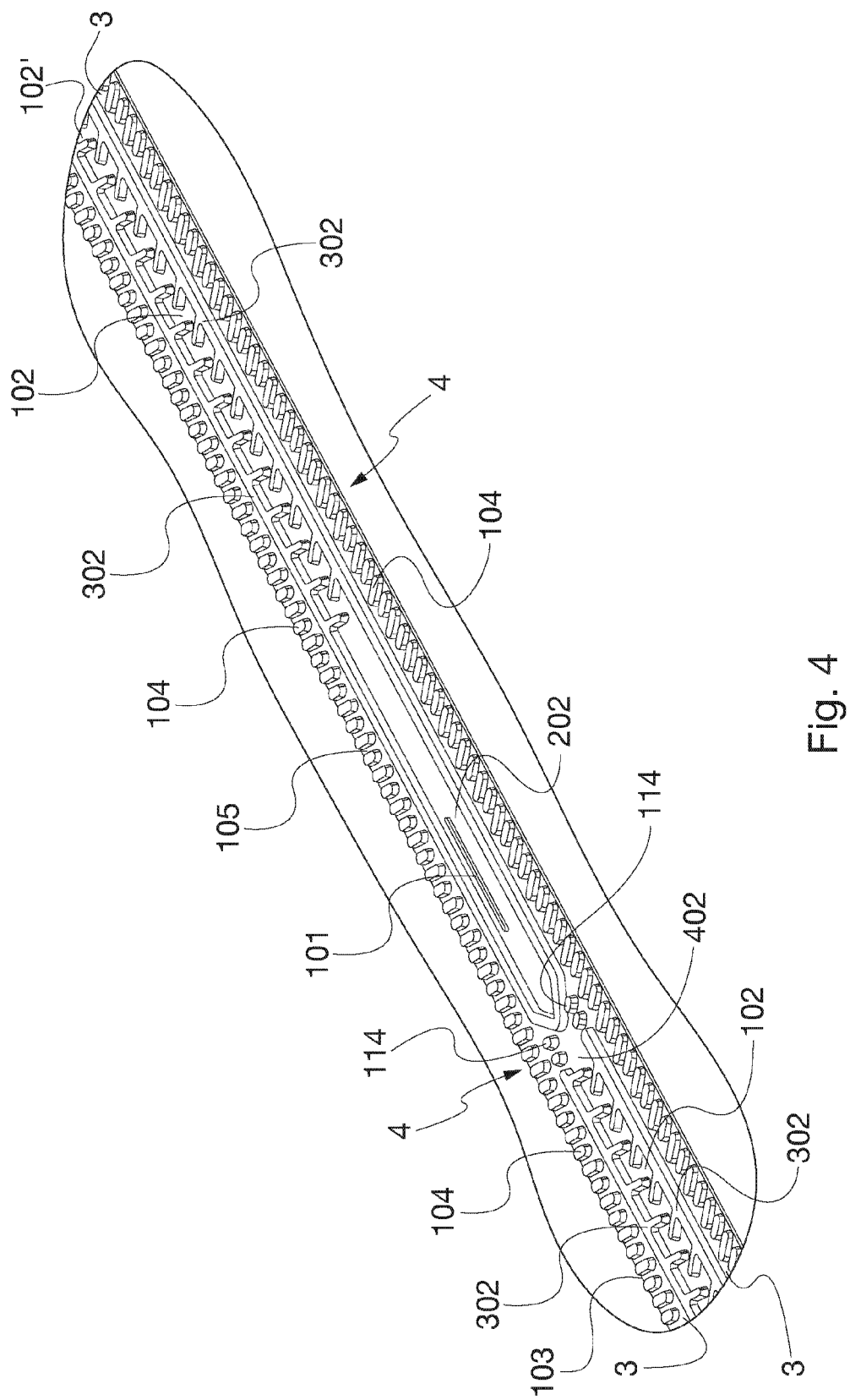
FIG. 4 is an enlarged detail of the pipe of FIG. 3 in the region of an outlet collecting element of a dripping unit and of the inlet of the pressure reduction element of the following dropping unit.
Figure 5:
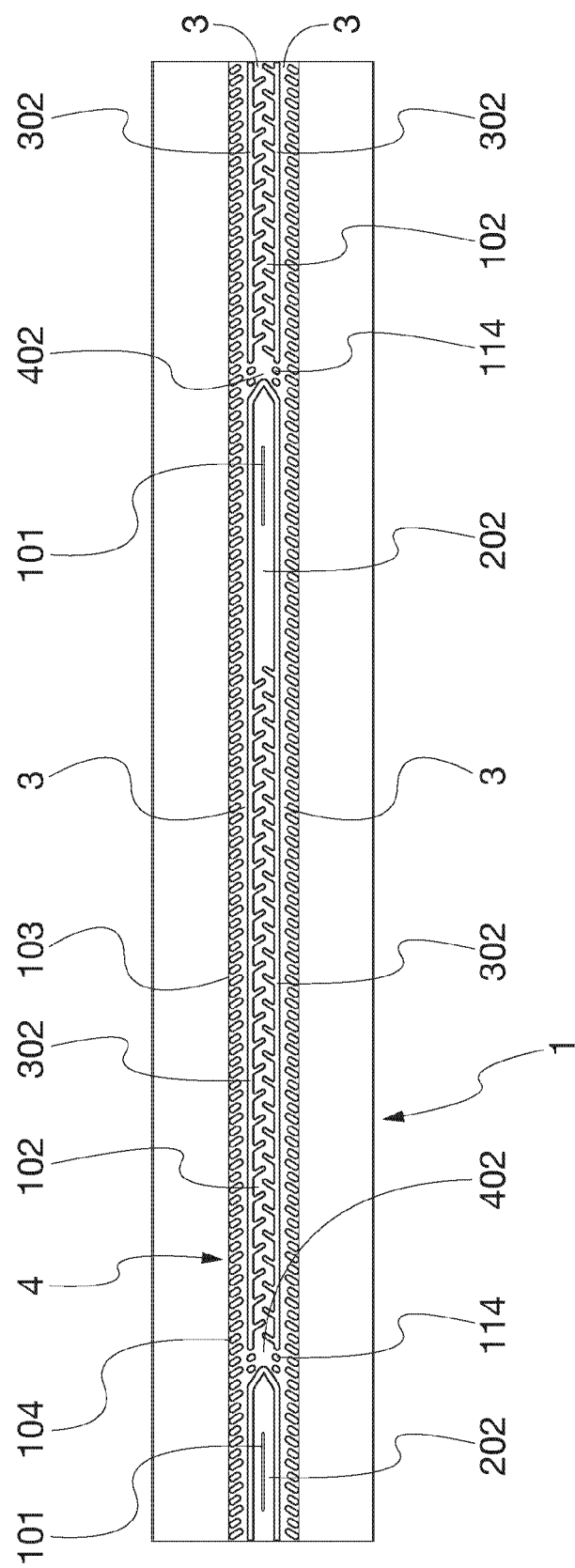
FIG. 5 is a plan view of the pipe according to FIG. 3, not showing the lower inner wall delimiting the inner space of the pipe, the two inlet collecting channels and the dripping units of the central row of dripping units.

It is to be noted that at inlets 402 of dripping units 2 provided at the end of the pressure reduction element 102, which end is adjacent to the end of the outlet collecting element 202 of the preceding dripping unit 2' there is provided a second filter 4'. As shown in FIGS. 4 and 5, filtering elements are generally composed of at least a row of adjacent tongues 104, which tongues are oriented according to a direction intermediate between the axial and radial directions of the pipe and are spaced apart. The wall 103 of inlet collecting channels 3 is made of only one row of said tongues 104, whereas at inlets 402 of the dripping units, there is provided a second row of said tongues 104' therefore making a further filtering barrier.

The filter 4 can be made also of two or more rows of tongues, which rows are substantially parallel and which tongues are arranged in such a position that tongues of one row are quincuncially arranged with respect to tongues of adjacent row or rows or coincide with gaps 130' between tongues of adjacent row or rows and vice versa.

The embodiment shown in FIGS. 1 to 5 has the advantage of allowing a high flow rate of fluid in dripping units 2 even if a high filtering ability of the filter 4 can be provided. The reduction of the passage section of the filter or the possibility to act like a filter with respect to filters generally used in prior art irrigation pipes without affecting the flow rate, but on the contrary obtaining a considerable increase of the flow rate with the same effectiveness of the filter is guaranteed by the fact that the filter length and so the inlet is twice the length of the irrigation pipe segment used when irrigating. In addition, the fact that the filter 4 extends throughout the walls 103 of delivery collecting channels 3 and the fact that the latter communicate with all or a at least a part of dripping units prevents the interruption of the supplying to one or more dripping units due to the localized deposit of materials on filters.

Figure 6:
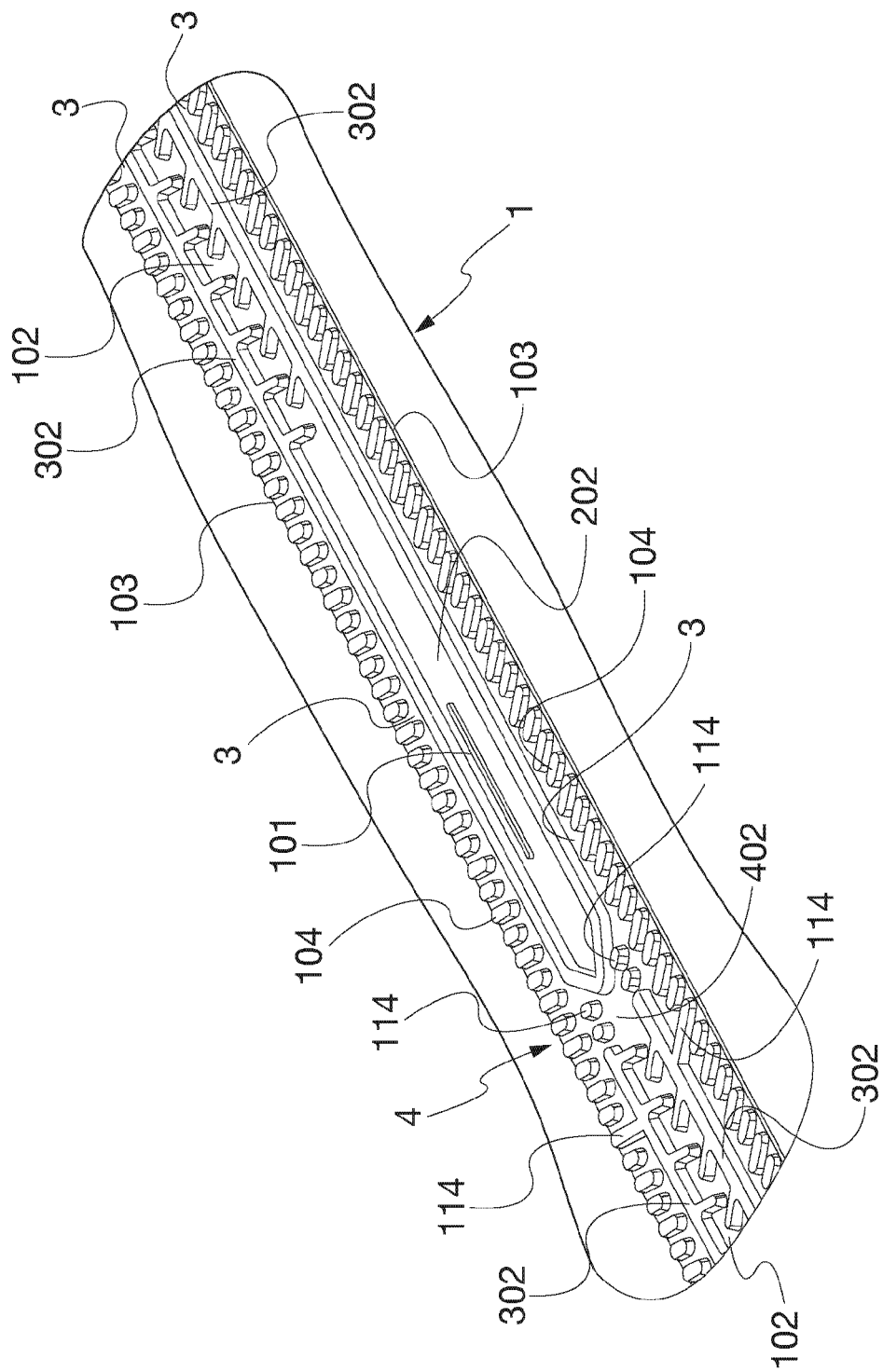
FIGS. 6 and 7 are, similarly to FIGS. 4 and 5, a variant exemplary pipe according to previous FIGS. 1 to 5, wherein the two inlet collecting channels are divided in a plurality of subsequent separated collecting channel segments i.e. they do not directly communicate one with the other.
Figure 7:
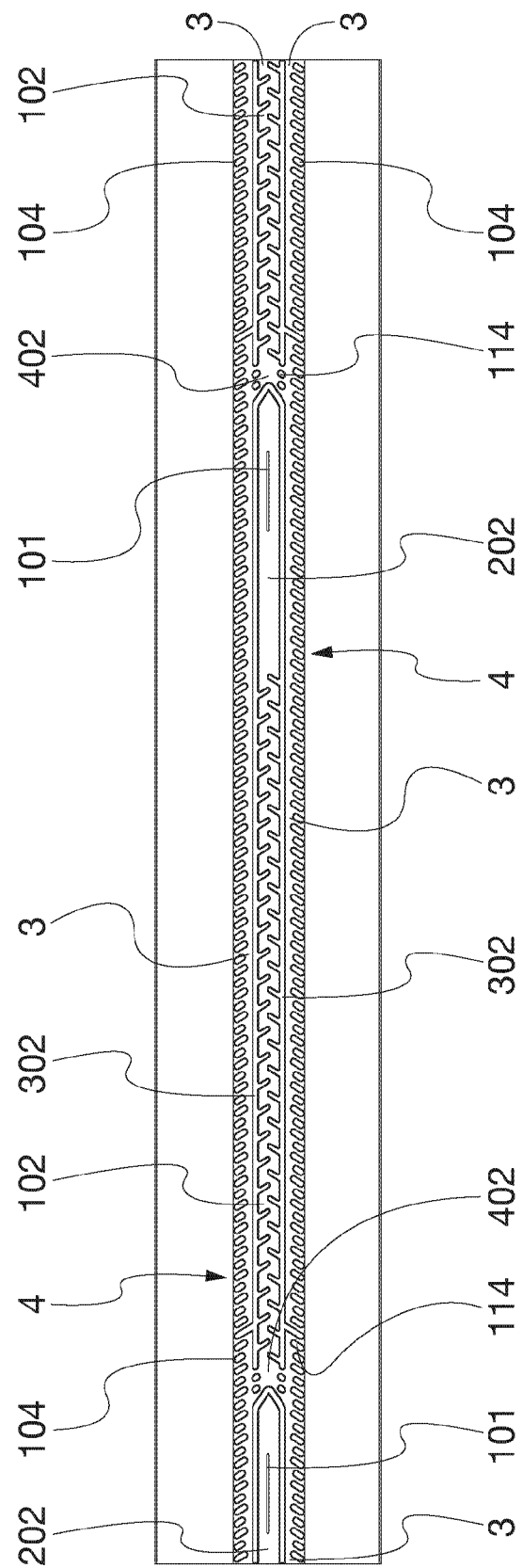

With reference to the variant embodiment of FIGS. 6 and 7, al least one of the two inlet collecting channels 3 or both of said inlet collecting channels 3 as it is shown in FIGS. 6-7 can be composed of a row of separated channel segments, i.e. that do not directly communicate and are aligned one after the other with reference to their longitudinal length and along the side wall or walls of the longitudinal row of dripping units. With reference to the embodiment shown in FIGS. 6 and 7, walls delimiting channel segments in the inner portion of the pipe indicated by 103, are completely made of a filtering element 4 like the previous embodiment.

In this case, advantageously the delimiting walls at the ends of channel segments are composed of one of the tongues 104 forming the filtering element and that now extend till being sealingly connected with the side wall 302 of dripping units 2, particularly of the pressure reduction element 102 of dripping units in the same axial position of said tongue. In FIGS. 6 and 7 these tongues are indicated by 104" in order to distinguish them from remaining tongues 104 of the filtering element 4.

With reference to the embodiment of FIGS. 1 to 5 and to the variant embodiment of FIGS. 6 and 7, inlet collecting channel or channels 3 may have inlets separated and arranged throughout the channels and at which inlets there is provided a filtering element 4. Such filtering element like the one that has as been previously described has a substantially known construction and it is composed of a row of adjacent tongues spaced at a predetermined extent and having an orientation tilted according to a direction intermediate between the axial direction of the pipe and the direction perpendicular to the inlet 203. The row of adjacent tongues extends throughout the extension of the inlet in the axial direction of the pipe or channel or side wall 103 delimiting thereof. Also in this case the filter 4 can be composed of only one row of tongues or of two parallel rows of tongues provided in such a position that tongues of one row are quincuncially arranged with respect to tongues of the adjacent row or rows or coincide with gaps between tongues of the adjacent row or rows and vice-versa.

However, these filters are also known and used.

With reference to a further variant, the irrigation pipe may be provided only with one inlet collecting channel 3 provided along only one of the longitudinal sides of the row of dripping units 2.

A second embodiment of the pipe according to the present invention provides that instead of an inlet collecting channel 3 in common with all or a part of the dripping units of a longitudinal row of dripping units, there is provided at least an outlet collecting channel 30 connecting or constituting itself the outlet collecting elements of dripping units 2, along which delivery holes or dripping slits 101 of the irrigation pipe are provided in the wall of the pipe along a line coinciding with at least some portions or all the extension of said outlet collecting channel.

Figure 8:
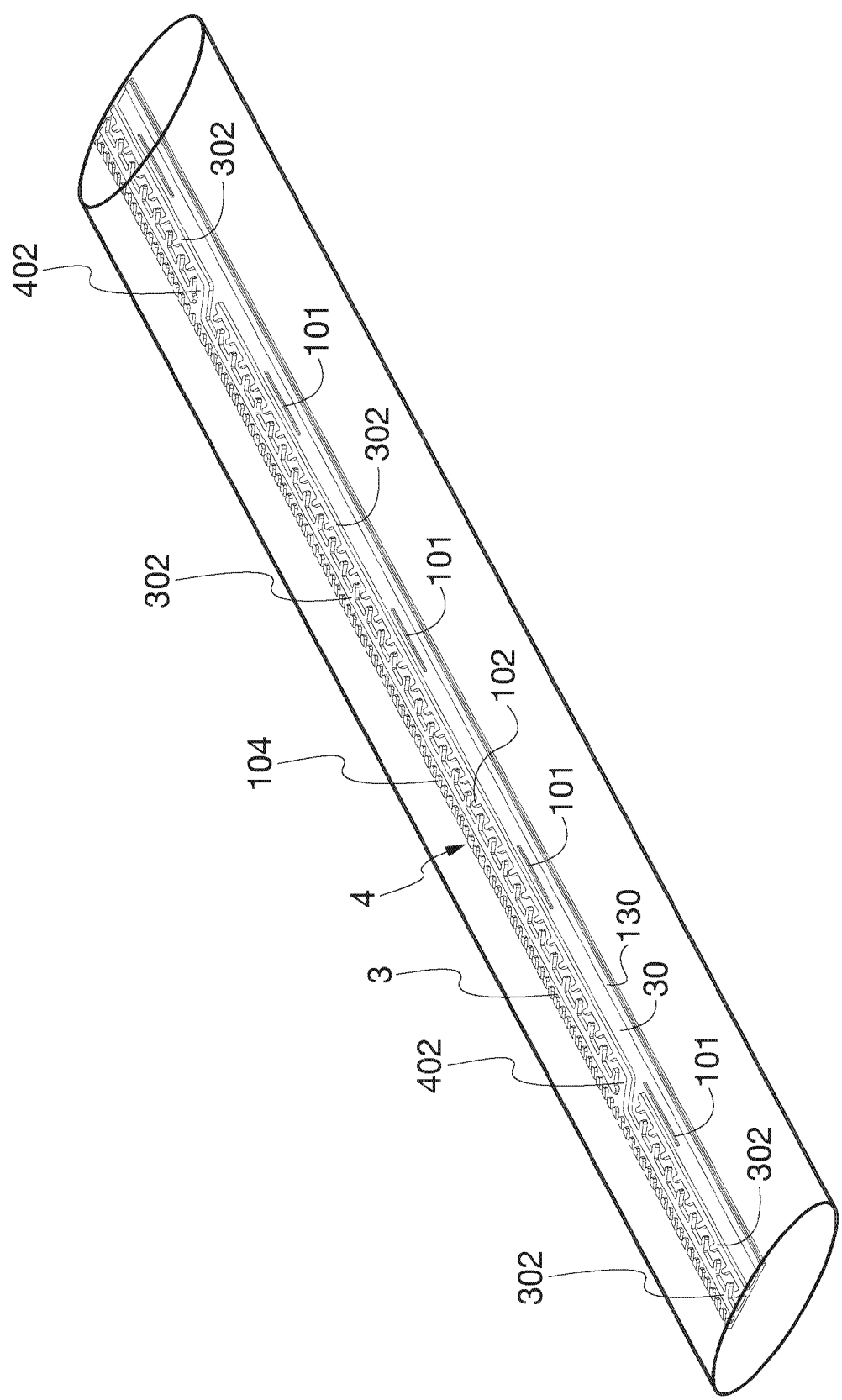
Figure 9:
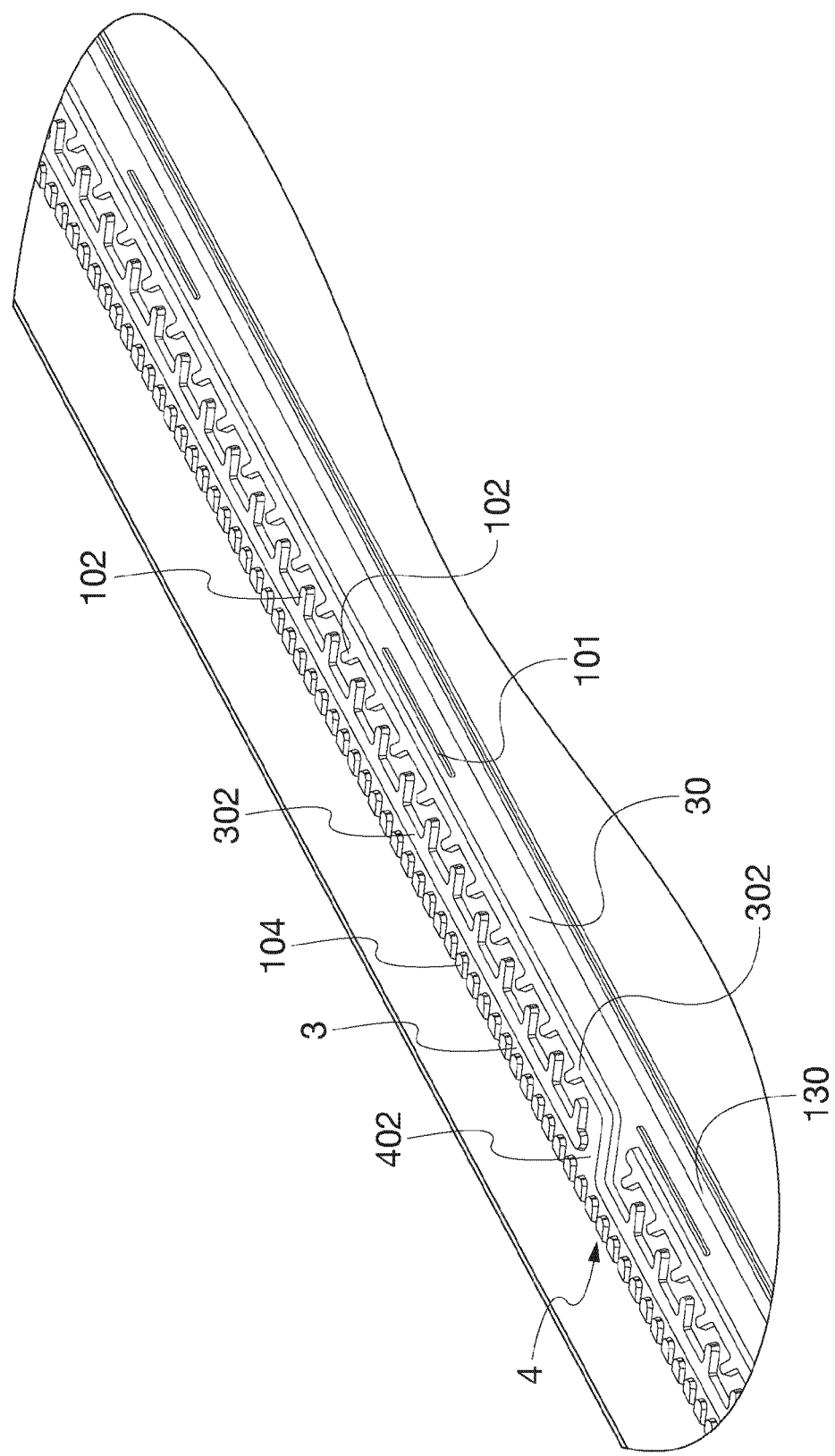

The embodiment of FIGS. 8 to 10 provides the outlet collecting channel 30 to be coinciding throughout its length with the row of delivery holes or dripping slits 101 and so constituting also individual outlet collecting elements of dripping units 2. Now, each one of said units comprises at least the pressure reduction element 102 and possibly also the inlet filtering element, whereas all or a part of the outlets of individual pressure reduction elements 102 come out at said outlet collecting channel 30.

The advantage is the fact that, however a common outlet collecting element or communicating outlet of individual dripping units aids in making even the delivery flow through holes of the row and if a filtering element or a pressure reduction element of a dripping unit becomes clogged, the fluid delivery from the corresponding hole is not interrupted.

Likewise to what has been already been described for inlet collecting channels 3, the outlet collecting channel may be a single continuous channel extending throughout the longitudinal extension of the pipe or of the longitudinal row of dripping units 2, or it may be composed of a plurality of channel segments that do not communicate and are longitudinally aligned one after the other such to make a row of channel segments parallel to the row of dripping units and arranged at least at a side thereof.

The presence of an outlet collecting channel 30 that at the same time forms also the collecting elements of the dripping units allows making the hole row with a different arrangement of holes without considering the arrangement or the step between individual outlet collecting elements 202 of dripping units, as it is necessary when dripping units are of the traditional type. It is also possible to add delivery holes by subsequent manual actions when the pipe for example has been already installed.

The embodiment shown in FIGS. 8 to 10 combines the presence of an inlet collecting channel 3 on one side of the longitudinal row of dripping units with an outlet collecting channel 30 along the opposite side of the row of dripping units. In this case, the inlet collecting channel 3 is made like the example in FIGS. 1 to 5, but it can be made according to any of the above different manners. That is valid also for the outlet collecting channel 30 that is made like a continuous channel and at the same time constitutes outlet collecting elements of the dripping units.

Therefore, in this embodiment, dripping units used in prior art irrigation pipes are no longer present. The central row of dripping units has become a row of pressure reduction elements 102, each of which is composed of a labyrinth structure with a longitudinal extension (known per se in the prior art) and which are aligned according to a longitudinal axis, whereas the outlet of pressure reduction element 102 comes out at the outlet collecting channel 30 and is provided at the longitudinal end adjacent to the end of the following pressure reduction element 102', that in turn comes out at the inlet collecting channel 3.

Such embodiment makes it considerably easy to have the pattern of the rib assembly provided on a material tape that is sealed against an inner wall band of the pipe. As it can be seen in FIG. 10 the side wall 103 of the inlet collecting channel 3 is composed of a filter and so of the transverse tongue assembly 104. At a certain distance from said row of tongues 104 there is provided a sequence of longitudinal Z-shaped ribs with branches tilted in opposite directions and arranged with the upper branch of one of the Z-shaped ribs overlapping at a certain lateral distance therefrom the lower branch of the subsequent Z-shaped rib, whereas said overlapped or coinciding branches on faced sides bear a series of transverse like-comb ribs that are quincuncially arranged and make a labyrinth channel.

On the side of the row of Z-shaped ribs, opposite to the offside at the inlet collecting channel 3 there is provided an outlet collecting channel laterally delimited by said row of Z-shaped ribs and by a longitudinal rib whereas a row of delivery holes 101 is provided at the outlet collecting channel 30.

The sequence of Z-shaped ribs forms the sequence of pressure reducing elements 102 and automatically also the outlets communicating with the outlet collecting channel 30 and inlets communicating with the inlet collecting channel 3.

Figure 12:
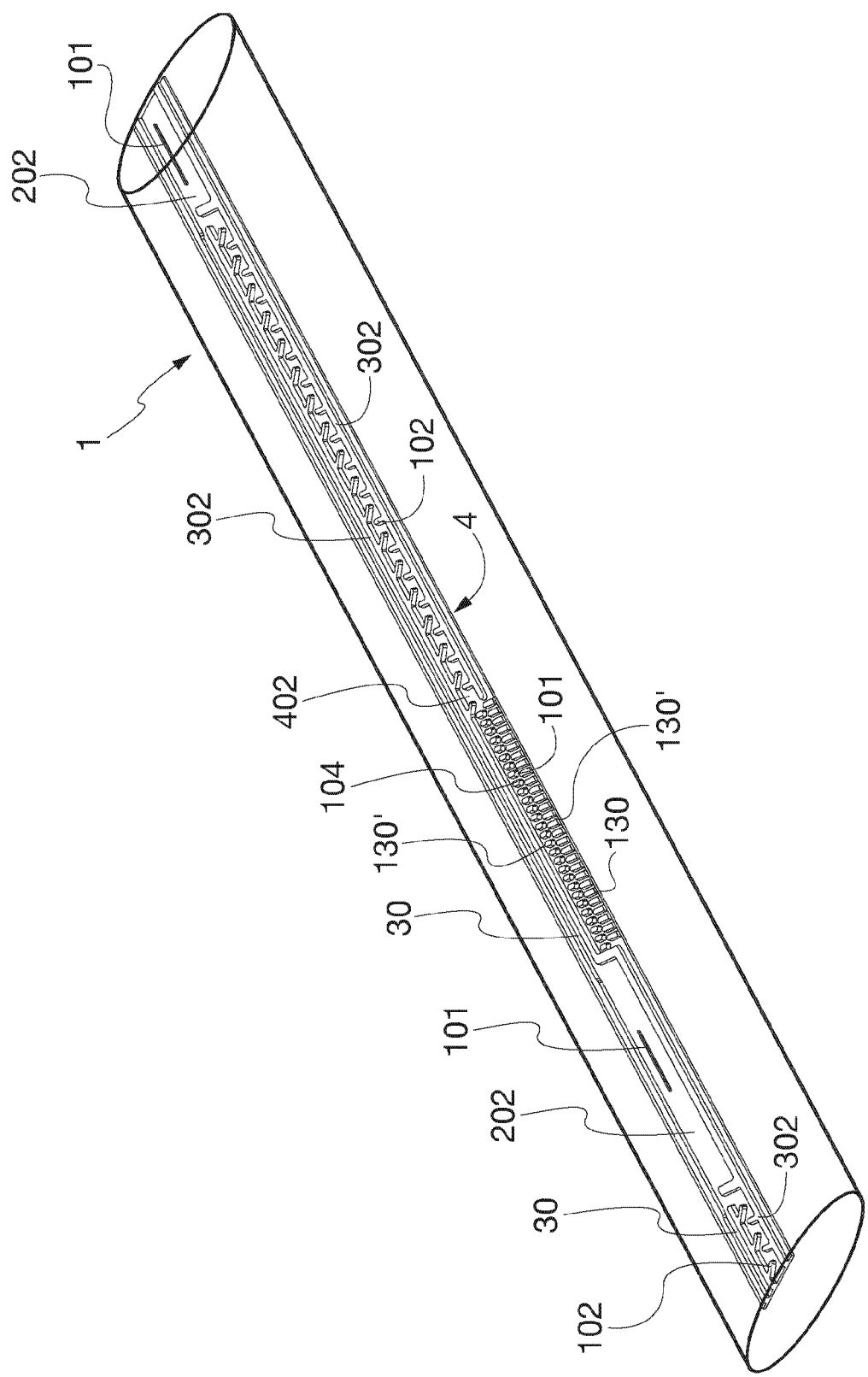
FIGS. 12 to 14 are, similarly to FIGS. 8 to 10, a variant exemplary pipe according to the present invention.
Figure 13:
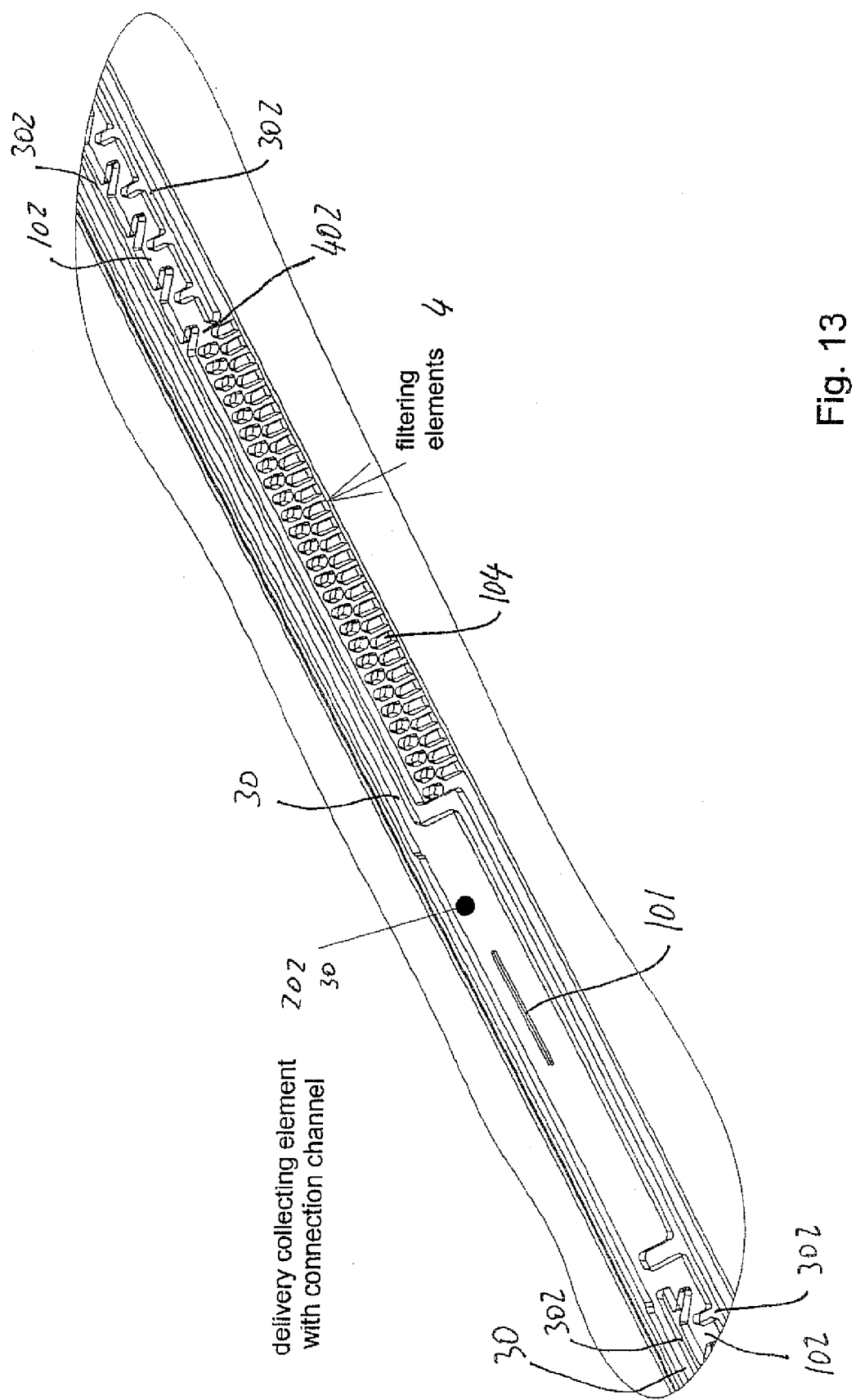
Figure 14:
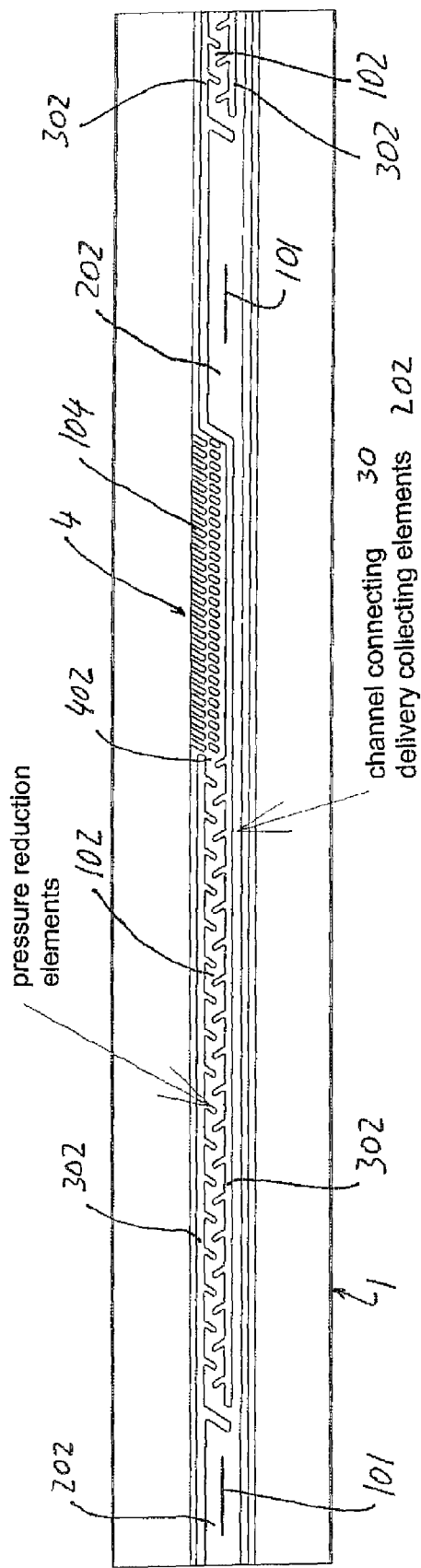

The variant embodiment according to FIGS. 12 to 14 shows a variant of the irrigation pipe wherein there is provided only the outlet collecting channel 30. This variant embodiment provides a particular shape of the outlet collecting channel that however may be made according to the variant embodiment of previous FIGS. 8 to 11. Moreover, in combination with such type of outlet collecting channel 30, it is possible to provide also one of the variants of previous embodiments as regards inlet collecting channels.

With reference to FIGS. 12 to 14, the irrigation pipe has no inlet collecting channels, but the row of dripping units 2 as in the prior art has a pressure reduction element 102 at whose inlet there is provided a filter 4 and whose outlet comes out at an outlet collecting element 202 communicating with at least a fluid delivery hole 101 provided in the pipe wall. Each outlet collecting element 102 of each dripping unit 2 is connected to the outlet collecting element 102 of other dripping units or at least to a part thereof by an outlet collecting channel 30 or by a segment of said outlet collecting channel 30.

In a further variant that is not described in detail and that can be provided in combination with or instead of the present one, the inlet collecting channel 3 may be composed of a channel having a continuous wall delimiting the space of the pipe and which wall has a plurality of inlets, at each of which there is provided a filter 4 preferably in the upstream region or axially coinciding with the inlet of the pressure reduction element 102 of individual dripping units. Advantages of the present invention and various possible variant embodiments are clear from the above.

With reference to the manufacturing of the irrigation pipe according to the present invention, this can be carried out according to known modes, wherein the continuous material tape is provided with a support wall 1" and ribs 1' projecting from a side thereof, which are made and arranged according to a predetermined pattern or according to a predetermined configuration on said tape. Said tape is secured with free ends of said ribs projecting therefrom against the inner wall of the pipe such that there is a watertight connection. Thus, ribs form both side walls delimiting collecting channels 3, 30 and the filter 4, and elements 102 and 202 of dripping units, whereas said channels and said elements are delimited at outside and inside regions of the pipe by the longitudinal band of the pipe wall, to which tips of ribs adhere and by the tape upon which said ribs are provided. Obviously the adhesion of the tape against the pipe wall by means of ribs can occur in any manner, for example by chemical-physical adhesion.

This manufacturing mode is known, however the tape used for making the pipe according to the present invention provides an intermediate element known per se and comprising a first rib assembly with a longitudinal extension forming a pressure reduction element 102 wherein ribs laterally delimit labyrinth-like fluid passages and a second outlet collecting element 202 communicating by an inlet with said first element, wherein ribs peripherally delimit an elongated region, said configuration of ribs being identically repeated in a row according to the longitudinal axis of said first and second element, whereas the rib configuration of the pressure reduction elements is such to have an inlet coming out at a space delimited by a longitudinal side rib provided at a certain distance at least on one of the two sides of the sequences of rib configurations forming pressure reduction elements 102 and outlet collecting elements 202 of the dripping units, which side rib is composed of rib segments spaced apart by open regions. This arrangement provides a rib configuration like one or more parallel rows of laterally adjacent tongues spaced apart, which row or rows extend throughout the whole region spacing two subsequent longitudinal rib segments and forming a filtering element.

When there are provided two or more rows of tongues, such tongues are quincuncially arranged or tongues of one row coincide with gaps between the tongues of the adjacent row. As an alternative to longitudinal rib segments on one or both sides of the sequence of rib configurations forming pressure reduction elements 102 and outlet collecting elements 202 of the dripping units, there is provided at least a row of spaced apart tongues, which is oriented in the longitudinal direction of said sequence of dripping units. This row of tongues extends throughout the longitudinal extension of said sequence of dripping units. Also in this case, it is possible to provide two or more parallel rows of adjacent tongues which are quincuncially arranged or having the tongues of a row coinciding with gaps between tongues of the other adjacent row.

In both of the above variants, tongues are preferably oriented in a direction transverse with respect to the longitudinal extension of the row and sequence of dripping units, and preferably tilted according to a direction intermediate between the axial direction and the radial direction of the pipe or tape.

Concerning variant embodiments of the pipe described above, there is applied a rib configuration on said tape that is correspondingly changed, and particularly when an outlet collecting channel 30 is provided at least at a side of the sequence of dripping units. That channel is composed of a continuous longitudinal rib extending at a certain distance from the rib assembly constituting faced side walls of the dripping units of said sequence.

When the irrigation pipe has a construction according to one of the variants providing both an inlet collecting channel 3 and an outlet collecting channel 30, at one of the two longitudinal sides of the rib assembly constituting the sequence of dripping units there is provided a rib arrangement of the type described for making the inlet collecting channel 3, whereas at the opposite side of said rib assembly constituting the dripping units there is provided a continuous rib constituting the side wall of the outlet collecting channel like the arrangement described above.

As already described above, the particular embodiment of FIGS. 8 to 11 provides the sequence of dripping units and inlet and outlet collecting channels to be made by a rib pattern on the tape of the following type, wherein the side wall 103 of the inlet collecting channel 3 is composed of a filter provided by the transverse tongue assembly 104. At a certain distance from said row of tongues 104, there is provided a sequence of longitudinal Z-shaped ribs with the branch tilted in the opposite direction and arranged with the upper branch of one of the Z-shaped ribs overlapping at a certain lateral distance therefrom the lower branch of the following Z-shaped rib, whereas said overlapped or coinciding branches on faced sides bear a series of transverse comb-like ribs that are quincuncially arranged and form a labyrinth channel.

At the side of the row of Z-shaped ribs opposite to the inlet collecting channel 3, there is provided an outlet collecting channel laterally delimited by said row of Z-shaped ribs and by a longitudinal rib, whereas a row of delivery holes 101 is at the outlet collecting channel 30.

The sequence of Z-shaped ribs forms the sequence of filtering elements 102 and automatically also the outlets communicating with the outlet collecting channel 30 and the inlets communicating with the inlet collecting channel 3.

As regards the variant of FIGS. 12 to 14, the rib pattern on the material tape can be derived from the one described above.

Z-shaped ribs overlap only for a part of the length of the upper branch the lower branch of the following Z-shaped rib, whereas the region between the end of the upper branch of a Z-shaped rib and the upper branch of the following Z-shape at the connection with the transverse intermediate branch tilted in the opposite direction with respect to the one of the Z-shape, is taken up by one or two parallel rows of transverse tongues constituting the inlet filter, whereas the region between the end of the lower branch of a Z-shaped rib and the lower branch of the adjacent Z-shaped rib constitutes the outlet collecting element, which at the side of said lower branches of said Z-shaped ribs is delimited by a longitudinal rib constituting the side wall delimiting in the inner part of the pipe the outlet collecting channel 30, and which it put in communication with individual outlet collecting elements 102, at least a delivery hole 101 being provided in the pipe wall at each outlet collecting element.

The invention claimed is:

1. An irrigation pipe comprising:
a pipe having at least a longitudinal row of delivery holes arranged at predetermined distances; and
a plurality of dripping units provided inside the pipe and communicating with the delivery holes, each dripping unit having at least an inlet communicating with an inner space of the pipe, a pressure reduction element receiving a fluid from the inlet, and an outlet collecting element communicating with at least one of the delivery holes,
wherein the inlet of each dripping unit receives the fluid from the inner space of the pipe through an inlet collecting channel extending along at least a plurality of the plurality of dripping units, and
wherein a proximal end of the outlet collecting element of one dripping unit forms a distal end of the pressure reduction element of a neighboring dripping unit, such to dispose the plurality of dripping units in a continuous row.

2. The irrigation pipe according to claim 1, wherein the pipe has a single inlet collecting channel extending longitudinally along the plurality of dripping units.

3. The irrigation pipe according to claim 2, wherein the inlet collecting channel extends adjacently to the plurality of dripping units and is delimited by a side longitudinal wall faced toward the inner space of the pipe and by side walls of the dripping units.

4. The irrigation pipe according to claim 3, wherein the side longitudinal wall faced toward the inner space of the pipe is provided with a plurality of inlets arranged throughout a length of said inlet collecting channel, and wherein the plurality of inlets enable the inlet collecting channel to communicate with the inner space of the pipe, each of the plurality of inlets being provided with an inlet filter.

5. The irrigation pipe according to claim 3, wherein the side longitudinal wall faced toward the inner space of the pipe is made permeable to the fluid throughout its longitudinal extension or throughout a greatest portion of said longitudinal extension, said longitudinal wall or the greatest portion of said longitudinal extension comprising a filtering element for an entering fluid.

6. The irrigation pipe according to claim 1, wherein the inlet collecting channel is continuous or composed of a sequence of inlet collecting channel segments that do not directly communicate one with the other and that are arranged in a longitudinal row.

7. The irrigation pipe according to claim 1, wherein each dripping unit communicates with said inlet collecting channel by an inlet of a pressure reduction unit of said dripping unit.

8. The irrigation pipe according to claim 1, wherein the plurality of dripping units are disposed longitudinally along the pipe, and wherein the plurality of dripping units have the inlet collecting channel and an outlet collecting channel disposed at sides thereof.

9. The irrigation pipe according to claim 8, wherein the inlet collecting channel and the outlet collecting channel are disposed one next to the other.

10. The irrigation pipe according to claim 9, wherein the plurality of dripping units are disposed in a central row comprising a longitudinal row of pressure reduction elements and provided with the inlet and the outlet, the inlet having one or more filtering elements and communicating with the inlet collecting channel or with a segment thereof, the longitudinal outlet communicating with the outlet collecting channel or with a segment thereof.

11. The irrigation pipe according to claim 8, wherein there are provided two inlet collecting channels.

12. The irrigation pipe according to claim 11, wherein the plurality of dripping units is centrally disposed and the pressure reduction element comprises a row of protrusions feeding to a dedicated outlet collecting element having one or more of the delivery holes, the row of protrusions being provided with an inlet communicating with only one or both inlet collecting channels or with a segment thereof, the row of protrusions being further provided with an outlet longitudinally feeding into a dedicated outlet collecting element.

13. The irrigation pipe according claim 8, wherein the plurality of dripping units comprise filtering elements having a plurality of rows of adjacent tongues or prisms, the tongues or prisms being arranged longitudinally in parallel or quincuncial pattern.

14. The irrigation pipe according to claim 13, wherein the filtering elements form a side wall facing the inner space of the pipe and feeding one or more inlet collecting channel or one or more segments thereof, the side wall of the filtering elements comprising the plurality of parallel rows of tongues or prisms laterally adjacent at a distance one from the other, the one or more rows of tongues or prisms extending in a longitudinal direction of the pipe, the tongues or prisms of individual rows being arranged parallel or quincuncially and forming a side wall delimiting at least one of the one or two inlet collecting channels.

15. The irrigation pipe according to claim 13, wherein one or more inlet collecting channel segments are separated by end walls formed by at least one of said adjacent tongues extending angularly in relation to a longitudinal axis of the one or more inlet collecting channel segments and connected to a side wall delimiting at least one of the plurality of dripping units.

16. The irrigation pipe according to claim 15, wherein there is a first inlet collecting channel delimited by a first portion of the filtering elements to provide a continuous filter and a second inlet collecting channel formed by a second portion of the filtering elements to provide a discontinuous or continuous filter.

17. The irrigation pipe according to claim 13, wherein the plurality of dripping units, the inlet collecting channel, the outlet collecting channel, and the filtering elements are formed on a tape configured to adhere to a pipe inner wall, a row of the delivery holes being positioned along an inner portion of the tape, the tape providing the dripping units, which are faced toward the inner space of the pipe, ribs outwardly projecting from a side of the tape bridging the tape from the pipe inner wall and forming, between said pipe inner wall and the tape, passages and/or chambers and walls separating the filtering elements, pressure reduction elements and outlet collecting elements of the dripping units, and further forming walls delimiting the outlet and/or inlet collecting channel and/or segments thereof.

18. The irrigation pipe according to claim 17, wherein the tape comprises a rib assembly providing at least one of pressure reduction elements with labyrinth-shaped fluid passages, at least some of the outlet collecting elements communicating with one of the pressure reduction elements, the rib assembly comprising longitudinal side ribs peripherally delimiting an elongated region wherein the rib assembly is disposed, the rib assembly being identically repeated along a longitudinal row, the rib assembly providing the at least one of the pressure reduction elements having an inlet at a space delimited by one of the longitudinal side ribs, the one of the longitudinal side ribs having parallel rib segments extending therefrom and spaced apart by open regions, the side ribs and the longitudinal side ribs being spaced from the filtering elements.

19. The irrigation pipe according to claim 17, wherein the tape comprises a rib assembly providing at least one or more of the pressure reduction elements with labyrinth-shaped fluid passages and peripherally delimiting an elongated region, the rib assembly being identically repeated in a longitudinal row delimited by longitudinal side ribs, an inlet to the rib assembly being delimited by one of the longitudinal side ribs, the one of the longitudinal side ribs being continuous in shape.

20. The irrigation pipe according to claim 13, wherein the tape comprises a plurality of rib assemblies providing the pressure reduction elements with labyrinth-shaped fluid passages, the rib assemblies being identically repeated in a longitudinal row,
wherein a first rib assembly providing a first portion of the pressure reduction elements delimits the inlet in a first longitudinal side rib from which the first rib assembly extends,
wherein the first longitudinal rib is continuous and extends longitudinally, and
wherein a second longitudinal side rib is provided at a distance from the first rib assembly, the second longitudinal side rib comprising rib segments spaced apart by open regions that form a second rib assembly facing the first rib assembly and spaced therefrom, the second rib assembly providing a second portion of the pressure reduction element.

21. The irrigation pipe according to claim 20, wherein there are provided two or more rows of tongues or prisms in such a position that the tongues or prisms are quincuncially arranged, or wherein tongues or prisms of one of the two or more rows are disposed in positions corresponding to gaps between tongues or prisms in an adjacent row.

22. The irrigation pipe according to claim 20, wherein there is provided at least one row of spaced apart tongues or prisms oriented in a longitudinal direction of a sequence of the dripping units, the at least one row of spaced apart tongues or prisms extending along a sequence of the dripping units.

23. The irrigation pipe according to claim 22, wherein there are provided two or more adjacent parallel rows of spaced apart tongues or prisms, which are quincuncially arranged, or in which tongues or prisms of one adjacent row are disposed to align with gaps between tongues or prisms of another adjacent row.

24. The irrigation pipe according to claim 23, wherein the tongues or prisms are oriented in a direction transversal with respect to a longitudinal extension of the sequence of the dripping units.

25. A tape for manufacturing an irrigation pipe comprising:
a plurality of dripping units disposed in a sequence;
an inlet channel in fluid communication with at least some of the dripping units, each dripping unit having at least an inlet configured to communicate with an inner space of the irrigation pipe, a pressure reduction element being configured to receive a fluid from the inlet, each dripping unit further having an outlet collecting element communicating with a delivery hole, wherein the inlet of each dripping is configured to receive the fluid through an inlet collecting channel extending along at least some of the plurality of dripping units and to feed the fluid to the at least one outlet, and wherein a proximal end of the outlet collecting element of one dripping unit forms a distal end of the pressure reduction element of a neighboring dripping unit, such to dispose the plurality of dripping units in a continuous row; and
a plurality of filtering elements configured to filter the fluid provided to the plurality of dripping units,
wherein the tape is configured to adhere longitudinally to an inner wall of the irrigation pipe,
wherein a row of the delivery holes extends longitudinally along the irrigation pipe,
wherein the tape provides a support wall for said plurality of dripping units, the support wall being disposed toward an inside of the irrigation pipe,
wherein the support wall has ribs outwardly projecting from the support wall and spacing the support wall from the inner wall of the irrigation pipe, the ribs being shaped according to such a pattern that, when ends the ribs adhere against the inner wall of the irrigation pipe, passages and chambers are provided between the inner wall of the pipe and the support wall, the passages and chambers providing pressure reduction elements separate from the filtering elements, and
wherein said ribs further provide or are coupled to side walls delimiting the inlet channel, or segments thereof.

26. The tape according to claim 25,
wherein the pressure reduction elements includes labyrinth-shaped fluid passages formed by the ribs along a longitudinal row,
wherein at least some of the ribs are disposed to provide a first portion of the pressure reduction elements,
wherein a first longitudinal side rib from which the at least some of the ribs extend is disposed to delimit an inlet to at least one of the pressure reduction elements, and
wherein a second longitudinal side rib is provided at a distance from the first longitudinal rib and comprises more of the ribs, the at least some of the ribs and the more of the ribs being spaced apart by open regions forming the pressure reduction elements.

27. An irrigation pipe comprising:
a pipe having at least a longitudinal row of delivery holes arranged at predetermined distances; and
a plurality of dripping units provided inside the pipe and communicating with the delivery holes, each dripping unit having at least an inlet communicating with an inner space of the pipe, a pressure reduction element receiving a fluid from the inlet, and at least an outlet communicating with at least one of the delivery holes,
wherein the inlet of each dripping unit receives the fluid from the inner space of the pipe through an inlet collecting channel extending along at least two or more of the plurality of dripping units and feeds the fluid to the at least one outlet aligned longitudinally with the pressure reduction element, or
wherein the outlets of at least two or more of the dripping units communicate with at least some of the delivery holes through an outlet collecting channel or a segment thereof extending along at least some of the plurality of dripping units.

28. The irrigation pipe according to claim 27, wherein the outlet collecting elements of the plurality of dripping units feed a same outlet collecting channel or a portion thereof, the delivery holes being provided at the outlet collecting channel or the portion thereof.

29. The irrigation pipe according to claim 27, wherein the outlet collecting channel extends adjacently to the plurality of dripping units and is delimited by a longitudinal side wall in a direction toward the inner space of the pipe and is further delimited by the plurality of dripping units, and wherein the outlets of the dripping units are disposed longitudinally, the delivery holes of the pipe being provided in a longitudinal wall of the pipe communicating with said outlet collecting channel.

30. The irrigation pipe according to claim 27, wherein there is a single outlet collecting channel along a longitudinal extension of the pipe or within a longitudinal extension of the plurality of dripping units.

31. The irrigation pipe according to claim 27, wherein the outlet collecting channel comprises a row of outlet collecting channel segments, which do not directly communicate one with the other, and wherein at least some of the dripping units, or pressure reduction elements of said dripping units, and at least some of the delivery holes of the pipe communicate with the outlet collecting channel segments.

32. The irrigation pipe according to claim 27, wherein there is a single longitudinal row of dripping units communicating with a single inlet or outlet collecting channel, the inlet or outlet collecting channel being disposed to a side of the single longitudinal row of the dripping units.

* * * * *